(12) United States Patent
Prins et al.

(10) Patent No.: US 10,788,888 B2
(45) Date of Patent: Sep. 29, 2020

(54) CAPTURING AND RENDERING INFORMATION INVOLVING A VIRTUAL ENVIRONMENT

(71) Applicants: Koninklijke KPN N.V., Rotterdam (NL); Nederlandse Organisatie Voor Toegepast-Natuuwetenschappelijk Onderzoek TNO, The Hague (NL)

(72) Inventors: Martin Prins, The Hague (NL); Hans Maarten Stokking, Wateringen (NL); Emmanuel Thomas, Delft (NL); Omar Aziz Niamut, Vlaardingen (NL); Mattijs Oskar Van Deventer, Leidschendam (NL)

(73) Assignees: KONINKLIJKE KPN N.V., Rotterdam (NL); NEDERLANDSE ORGANISATIE VOOR TOEGEPAST-NATUUWETENSCHAPPELIJK ONDERZOEK TNO, The Hague (NL)

( * ) Notice: Subject to any disclaimer, the term of this patent is extended or adjusted under 35 U.S.C. 154(b) by 0 days.

(21) Appl. No.: 16/306,432

(22) PCT Filed: Jun. 6, 2017

(86) PCT No.: PCT/EP2017/063680
§ 371 (c)(1),
(2) Date: Nov. 30, 2018

(87) PCT Pub. No.: WO2017/211802
PCT Pub. Date: Dec. 14, 2017

(65) Prior Publication Data
US 2019/0230331 A1      Jul. 25, 2019

(30) Foreign Application Priority Data
Jun. 7, 2016    (EP) .................................... 16173379

(51) Int. Cl.
*G06F 3/01* (2006.01)
*G06T 19/00* (2011.01)
(Continued)

(52) U.S. Cl.
CPC ............ *G06F 3/011* (2013.01); *G06F 3/0304* (2013.01); *G06T 19/003* (2013.01);
(Continued)

(58) Field of Classification Search
CPC .......... G06F 3/011; G06F 3/005; G06F 3/012; G06F 3/013; G06F 3/0304; G06F 1/163;
(Continued)

(56) References Cited

U.S. PATENT DOCUMENTS

| 2008/0310707 | A1  | 12/2008 | Kansal et al. | |
| 2010/0045701 | A1* | 2/2010 | Scott | G01S 5/163 345/633 |

(Continued)

FOREIGN PATENT DOCUMENTS

| EP | 2 579 128 A1 | 4/2013 |
| WO | WO2016014871 A1 | 1/2016 |

OTHER PUBLICATIONS

European Search Report for International Application No. EP16173379.5, entitled "Capturing and Rendering Information Involving A Virtual Environment," dated Sep. 13, 2016.
(Continued)

*Primary Examiner* — Sanjiv D. Patel
(74) *Attorney, Agent, or Firm* — Hamilton, Brook, Smith & Reynolds, P.C.

(57) ABSTRACT

A method of facilitating capturing visual information at a first location (1) for display at a second location (2) is disclosed. At the first location, a virtual reality device (11) can be configured to render visual information representing a virtual environment, and at least one capturing device (12)
(Continued)

can be configured to capture information representing a real environment comprising the virtual reality device (11). At the second location, at least one monitor (21) can be configured to render the information captured by the at least one capturing device (12). The method comprises determining an orientation of at least one capturing device (12) relative to the virtual reality device (11), and providing in the virtual environment a visual indication of said orientation.

18 Claims, 7 Drawing Sheets

(51) Int. Cl.
　　*G06F 3/03*　　　(2006.01)
　　*H04N 13/117*　　(2018.01)
　　*H04N 13/366*　　(2018.01)

(52) U.S. Cl.
　　CPC .......... *G06T 19/006* (2013.01); *H04N 13/117* (2018.05); *H04N 13/366* (2018.05); *G06T 2219/024* (2013.01)

(58) Field of Classification Search
　　CPC . G06F 3/017; G06T 7/80; G06T 2207/30204; G06T 2207/30244; G06T 7/73; G06T 7/70; G06T 19/006; G06T 2219/024; G02B 2027/0138; G02B 2027/0178; G02B 27/0172; G02B 27/017; G06K 9/00671; G06K 9/4604; G06K 9/52; H04N 13/117; H04N 5/23203; H04N 5/247; H04N 13/36
　　See application file for complete search history.

(56) References Cited

U.S. PATENT DOCUMENTS

| | | | | |
|---|---|---|---|---|
| 2012/0140017 | A1* | 6/2012 | Hong | ...................... H04N 7/144 348/14.1 |
| 2012/0237085 | A1* | 9/2012 | Meier | ...................... G06K 9/72 382/103 |
| 2013/0222371 | A1 | 8/2013 | Reitan | |
| 2015/0002542 | A1* | 1/2015 | Chan | ....................... G06F 3/048 345/633 |
| 2015/0260474 | A1 | 9/2015 | Rublowsky et al. | |
| 2015/0278636 | A1* | 10/2015 | Chen | ..................... G06K 9/3216 382/195 |
| 2016/0098095 | A1* | 4/2016 | Gonzalez-Banos | ..... G06F 3/017 345/156 |
| 2016/0187974 | A1* | 6/2016 | Mallinson | ................ G06F 3/014 463/32 |
| 2016/0260251 | A1* | 9/2016 | Stafford | ............. G02B 27/0179 |
| 2016/0300387 | A1* | 10/2016 | Ziman | .................... G06T 19/003 |
| 2016/0342840 | A1* | 11/2016 | Mullins | .............. G06K 9/00671 |
| 2017/0277940 | A1* | 9/2017 | Vandonkelaar | ........... H04N 5/44 |

OTHER PUBLICATIONS

International Preliminary Report on Patentability for International Application No. PCT/EP2017/063680,entitled "Capturing and Rendering Information Involving A Virtual Environment," dated May 24, 2018.

Dumont, M., et al., "A Prototype for Practical Eye-Gaze Corrected Video Chat on Graphics Hardware," Conference: Conference: SIGMAP 2008—Proceedings of the International Conference on Signal Processing and Multimedia Applications, 8 pages (2008).

Giger, D., et al., "Gaze Correction With a Single Webcam," IEEE International Conference on Multimedia and Expo (ICME), 6 pages (2014).

International Search Report and Written Opinion for International Application No. PCT/EP2017/063680,entitled "Capturing and Rendering Information Involving A Virtual Environment," dated Aug. 8, 2017.

Reply to Written Opinion for for International Application No. PCT/EP2017/063680,entitled "Capturing and Rendering Information Involving A Virtual Environment," dated Feb. 13, 2018.

* cited by examiner

CAPTURING AND RENDERING INFORMATION INVOLVING A VIRTUAL ENVIRONMENT

This application is the U.S. National Stage of International Application No. PCT/EP2017/063680, filed Jun. 6, 2017, which designates the U.S., published in English, and claims priority under 35 U.S.C. § 119 or 365(c) to European Application No. 16173379.5, filed Jun. 7, 2016. The entire teaching of the above applications are incorporated herein by reference.

FIELD OF THE INVENTION

The present invention relates to capturing and rendering information involving a virtual environment. More in particular, the present invention relates to a method of and a system for capturing information, such as visual information, and rendering the captured information, while rendering a virtual environment.

BACKGROUND OF THE INVENTION

Virtual reality (VR) techniques are well known. Typically, a user may wear a head-mounted display (HMD) or a similar portable device which renders a virtual environment visually and/or aurally. The virtual environment may comprise computer-generated images (CGIs) and/or computer-generated or captured sound. A visual virtual environment typically replaces the real environment, that is, a user in a virtual environment is normally not capable of viewing the real world. When using augmented reality (AR) techniques, the HMD or other device may superimpose CGIs or other images upon the view of the real world, thus leaving the user able to see part or all of the real world. Embodiments of AR techniques may include analogue transparent (that is, see-through) glasses and digital transparent glasses (which may be capable to record and display. Similarly, in VR the user may not be able to hear sounds of the real world, while in AR the user may hear sounds of both the real world and the virtual environment.

As a user of VR techniques is typically not able to see the real world, she does not know which direction she is facing. However, it is often desired to know this direction, in particular when the user is moving in the real world while viewing the virtual world. Techniques for determining which direction a user or her portable virtual reality device is facing in the real world are known. European patent application EP2579128 A1, for example, discloses a device for determining the viewing direction of a user of a portable device in the real world and to change the viewing direction in the virtual world as the viewing direction in the real world changes.

In video conferencing, for example, it is desired that the users at both locations face a camera, as this allows the users to see each other's facial expressions, which improves communication. However, if the user at a first location is wearing a virtual reality device, she will normally not be able to see the camera, and will therefore not be able to face the camera. As a result, the user at a second location may not be able to see the face of the user at the first location, thus making the video conferencing less effective. Also, eye contact (in case an at least partially transparent VR or AR device is used) will not be possible. In addition, the sound quality of video conferencing can be significantly better when a user is facing her microphone, instead of speaking in another direction.

Also for applications other than video conferencing it may be desired to align the portable VR device with a camera, microphone and/or other capturing device.

SUMMARY OF THE INVENTION

It is an object of the present invention to solve this problem by providing a method of facilitating capturing information, in particular visual information, wherein:
- visual information representing a virtual environment is rendered using a virtual reality device,
- information representing a real environment comprising the virtual reality device is captured using at least one capturing device, and
- the captured information is rendered;

the method comprising:
- determining an orientation of at least one capturing device relative to the virtual reality device, and
- providing in the virtual environment a visual indication of said orientation.

By determining the relative orientation of a capturing device, and by providing in the virtual environment a visual indication of the relative orientation, any misalignment between the capturing device and the virtual reality device providing the virtual environment may be indicated and brought to the attention of the user. This, in turn, may allow the user of the virtual reality device to adjust her orientation so as to align the virtual reality device and the capturing device.

Various types of virtual reality devices may be used, such as portable devices (which may be worn as glasses) and (holographic) projection devices which may project the virtual environment in a room, and which may be portable but are typically stationary devices. Also when a projection device is used, it may still be advantageous to align the projection with the capturing device. The term virtual reality devices in general comprises augmented reality devices, i.e. the virtual reality device may be an augmented reality device.

The method of the invention may be used in an environment where one or more capturing devices capture information representing the real environment, which captured real environment includes the virtual reality device which may be carried by a user. That is, the at least one capturing device may capture an image (that is, visual information which may be represented by a video stream) and optionally also sound (that is, aural information which may be represented by an audio stream). The orientation of the virtual reality device is then derived from the image and/or from the sound, for example by using pattern recognition techniques which may be known per se. In some embodiments, the virtual reality device may be provided with a dedicated orientation detection unit which may utilize radar technology, for example, to determine the orientation of the capturing device. In still other embodiments, the capturing device (or devices) may be provided with a dedicated orientation detection unit which may utilize radar technology, for example, to determine the orientation of the VR device.

The method of the invention may be carried out at a single location or at two (or more) locations. The rendering of visual (and/or aural) information using a virtual reality device, and the capturing of (visual and/or aural) information using at least one capturing device may be carried out at a first location, while the rendering of the captured information may take place at a second locations, which locations may or may not be different. Determining an orientation may even take place at a third location, which may or may not be different from the first location and/or the second location. At the first location, the virtual reality device and the capturing device may be spaced apart, although their location may collectively be referred to as the first location. Accordingly, an embodiment of the method of facilitating involves capturing visual and/or aural information at a first location for rendering at a second location, wherein at the first location:

visual and/or aural information representing a virtual environment is rendered using a virtual reality device, and information representing a real environment comprising the virtual reality device is captured using at least one capturing device; and wherein at the second location:

the information captured at the first location is rendered; the method comprising:

determining at the first location an orientation of at least one capturing device relative to the virtual reality device, and providing in the virtual environment a visual indication of said orientation.

The time between the capturing of the information representing the real environment comprising the virtual reality device, and the rendering of the captured information, may be real-time, real-time or delayed. For example, the captured information may first be cached, stored or recorded in a memory before rendering.

The visual indication provided in the virtual environment may be provided by a LED or a small set of pixels showing a particular colour, for example green for alignment with the capturing device and red for misalignment, and/or other colours representing "left" or "right", and in some embodiments also "up" and "down". In the virtual environment, arrows indicating the direction of desired movement may be shown.

Additionally, or alternatively, the view of the virtual environment may be shifted so as to represent the orientation. That is, if the orientation corresponds with 30° to the left, for example, the view of the virtual world may be rotated approximately 30° to the left, thus suggesting the user to turn her head to the left.

It is noted that in addition to, or instead of a visual indication, an aural indication of the orientation of the capturing device may be used, such as specific sounds representing "left" and "right", and possibly also "up" and "down", and/or placing a virtual audio source at an orientation corresponding with the orientation of the capturing device in the real world using a headset integrated in a wearable virtual reality device or using a surround sound setup. The virtual audio source may represent captured audio information, for example speech of a user captured at the second location.

In some embodiments, a camera and/or monitoring screen or display may be shown in the virtual world at an orientation substantially corresponding with the orientation of the capturing device in the real world. That is, providing in the virtual environment a visual indication of the orientation of at least one capturing device may comprise rendering in the virtual environment an orientation indication of the at least one capturing device. In some embodiments, therefore, providing an indication of the relative orientation of the at least one capturing device in the virtual environment may comprises rendering in the virtual environment a virtual monitor at a relative orientation corresponding with the relative orientation of the at least one capturing device in the real environment, which virtual monitor preferably renders visual information captured by at least one further capturing device. It will be understood that the virtual monitor is a rendition of a monitoring screen or display, and that in some embodiments the virtual monitor may comprise a rendition of a camera or other capturing device.

The method may further comprise:

using at least two capturing devices, determining a respective orientation of the at least two capturing devices relative to the virtual reality device, determining a respective distance of the at least two capturing devices relative to the virtual reality device, and rendering in the virtual environment at least two virtual monitors at respective relative orientations and respective relative distances corresponding with the relative orientations and the respective distances of the at least two capturing devices in the real environment.

By using at least two capturing devices, determining their respective orientation and distances, and rendering in the virtual environment corresponding virtual monitors, it is possible for a user to face one of the monitors when videoconferencing, for example. The orientations of the virtual monitors suggest to a user in which direction to look, which makes videoconferencing much more effective.

In some embodiments of the method, determining the relative orientation of the at least one capturing device in relation to the virtual reality device may comprise using the at least one capturing device. That is, the captured images or sounds may be processed to determine the relative orientation. Additionally or alternatively, a capturing device may be provided with a dedicated orientation detection unit which may, for example, utilize radar techniques.

In some embodiments, the virtual reality device may be provided with at least one additional capturing device for determining the relative orientation of the virtual reality device. That is, in such embodiments a first capturing device may capture information relating to the real environment so as to render this information, while a second capturing device may be used to capture the virtual reality device so as to determine its orientation. In such embodiments, two different video streams may be generated, which may be used for different purposes and may therefore be optimized for different purposes. The second capturing device may, for example, zoom in on the virtual reality device, while the first capturing device may produce a wide-angle view of the real environment.

As mentioned above, the information representing the real environment may include visual information, aural information or both. To process aural information, the at least one capturing device may comprise a microphone while at least one monitor at the second location may comprise a loudspeaker. To process visual information, the at least one capturing device may comprise a camera while at least one monitor at the second location may comprise a visual monitor.

In the embodiments discussed above, an orientation of at least one capturing device relative to the virtual reality device may be determined. The method may further comprise determining an orientation of the virtual reality device relative to the at least one capturing device, and preferably also adjusting the rendering of the virtual monitor in the virtual environment in dependence of said orientation. That is, the relative orientation of the virtual reality device with respect to the capturing device may be determined. This may be done to determine whether the virtual reality device is within a suitable viewing angle of the capturing device, for example. It will be understood that at some relative orientations of the virtual reality device, the real environment captured by the capturing device no longer includes the virtual reality device. By rendering a virtual monitor in the virtual environment, at a relative orientation corresponding to the relative orientation of the capturing device in the real environment, the user's attention will be drawn to the monitors and a less suitable relative orientation of the virtual reality device may be corrected.

The rendering of the virtual environment and the capturing of information relating to the real environment may take place at a first location, while the rendering of the captured information may take place at a second location. The first location and the second location may be two distinct locations, for example when video conference is being held. However, in some embodiments, the first location and the second location may be identical. That is, in some embodiments the rendering of the information representing the real world may take place at the same location where that information is captured. This may for example be the case when two people are in the same room and in the same virtual environment, for example because they are both playing a game in virtual reality, while they are communication with each other. They may both have a camera for this purpose, preferably in front of them.

The present invention further provides a software program product comprising instructions for causing a processor to carry out the method according to any of the preceding claims. The software program product may be stored on a tangible carrier, such as a DVD or a USB stick. Alternatively, the software program product may be stored on a server from which it may be downloaded using the Internet. The software program product contains software instructions which can be carried out by the processor of a device, such as a server, a user device (for example a smartphone), and/or a monitoring device.

The present invention yet further provides a system for facilitating capturing visual information, wherein the system comprises:
- a virtual reality device configured to render visual information representing a virtual environment,
- at least one capturing device configured to capture information representing a real environment comprising the virtual reality device, and
- at least one monitor configured to render the information captured by the at least one capturing device, the system further comprising a control subsystem configured for:
- determining an orientation of the at least one capturing device relative to the virtual reality device, and for
- causing the virtual reality device to provide in the virtual environment a visual indication of said orientation.

By determining the relative orientation of a capturing device, and by providing in the virtual environment a visual indication of the relative orientation, any misalignment between the capturing device and the virtual reality device providing the virtual environment may be indicated and brought to the attention of the user. This, in turn, may allow the user of the virtual reality device to adjust her orientation so as to align the virtual reality device and the capturing device, and/or to align herself with the capturing device.

In an embodiment, the control subsystem may comprise:
- a device detector unit configured for detecting an orientation of the at least one capturing device and for producing first orientation data,
- a device tracker unit configured for tracking an orientation of a virtual reality device and for producing second orientation data, and
- a media orchestrator configured for combining the first orientation data, the second orientation data and media data to produce an orientation-dependent media stream.

By providing a device detector unit, the orientation of the capturing device (or devices) may be determined. By providing a device tracker unit, the orientation of the virtual reality device can be tracked. The media orchestrator may produce a media stream which may be dependent on both orientations and which may be rendered by the virtual reality device. Such a media stream may, for example, represent a virtual monitor at an orientation corresponding with the relative orientation of the capturing device in the real environment.

The virtual reality device and the capturing device may be at a first location, while the at least one monitor may be at a second location, which location may or may not be different.

The at least one capturing device may comprise a microphone and the at least one monitor may comprise a loudspeaker. Alternatively, or additionally, the at least one capturing device may comprise a camera and the at least one monitor may comprise a visual monitor.

In some embodiments, the virtual reality device may be a portable device, preferably a wearable device. In other embodiments, the virtual reality device may be a stationary device. In embodiments utilizing holography and/or projection techniques (such as remote in-eye projection) to provide the virtual reality, for example, the virtual reality device may be stationary.

The present invention still further provides a control subsystem configured for use in the system as described above.

BRIEF DESCRIPTION OF THE DRAWINGS

The present invention will further be explained with reference to exemplary embodiments illustrated in the drawings, in which.

DETAILED DESCRIPTION OF EMBODIMENTS

The invention relates to capturing visual information at a first location for display at a second location, which locations may or may not be identical. A method according to the invention may include rendering visual information representing a virtual environment using a virtual reality device at the first location, capturing information representing a real environment using at least one capturing device at the first location, rendering at the second location the information captured at the first location, determining at the first location an orientation of at least one capturing device relative to the virtual reality device, and providing in the virtual environment a visual indication of said orientation.

The real environment may include the virtual reality device, although in some embodiments the real environment captured by a capturing device may not include the virtual reality device, as the orientation of the virtual reality device may be determined in other ways, for example by using dedicated orientation detection units.

Figure 1:
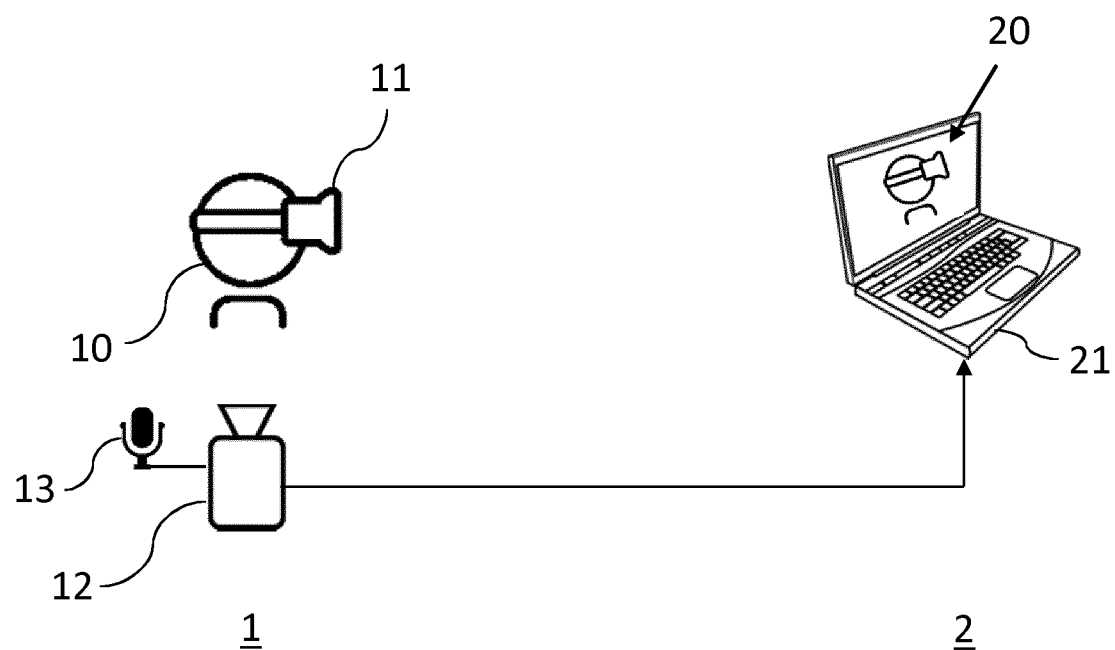
FIG. 1 schematically shows capturing information at a first location and rendering the captured information at a second location.

The exemplary arrangement shown schematically in FIG. 1 comprises a virtual reality device 11, a first capturing device 12 and a second capturing device 13 at a first location 1, and a rendering device 21 at a second location 2. The first capturing device 12 is shown to be directly connected to the rendering device 21, while the second capturing device 13 is shown to be connected to the rendering device 21 via the first capturing device 12.

In the embodiment shown in FIG. 1, the virtual reality (VR) device 11 is a head-mounted display (HMD) worn by a user 10. The first capturing device 12 includes a camera, which may be configured for producing a video stream consisting of consecutive images. The camera may alternatively, or additionally, be configured for producing single (that is, still) images. The (optional) second capturing device 13 includes, in the embodiment shown, a microphone.

The arrangement shown in FIG. 1 may be used for video conferencing, for example. The (first) user 10 at the first location 1 may have a video conference with a (second) user at the second location 2. The image (or visual information) 20 captured by the first capturing device 12 may be rendered on the screen of the rendering device 21, which in the embodiment shown includes a laptop computer. It will be understood that the laptop computer may also be used for capturing visual and/or aural information at the second location 2, if so desired.

During video conferencing, the participants typically face the device they are communicating with, such as the laptop computer (rendering device 21) at the second location 2. However, the user 10 cannot see the first capturing device (camera) 12 as she is wearing the HMD and sees a virtual environment, not the real environment. For this reason, the user may face an arbitrary direction. In the example shown in FIG. 1, the camera captures the side of the user's head, and consequently the image 20 on the screen of the rendering device 21 also shows the side of the user's head. For the (second) user of the rendering device 21, this is disadvantageous as she will not be able to see the facial expressions of the first user 10 and as a result, the video conference will be less effective. In addition, it is unpleasant for the second user, especially when the camera captures the back of the first user's head.

Figures 2A, 2B:
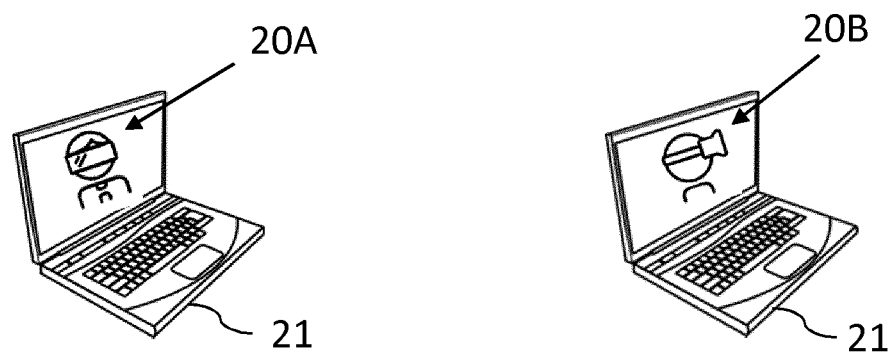
FIGS. 2A and 2B schematically show a desired and a undesired rendering of captured information.

The problem underlying the invention is shown in more detail in FIGS. 2A and 2B. In FIG. 2A, the image 20A shown on the screen of the rendering device 21 is the desired image: the (first) user faces the camera and hence faces the second user. However, the situation of FIG. 1 results in image 20B of FIG. 2B, where the side of the first user's head is rendered. It will be clear that this is undesired.

Figure 3A:
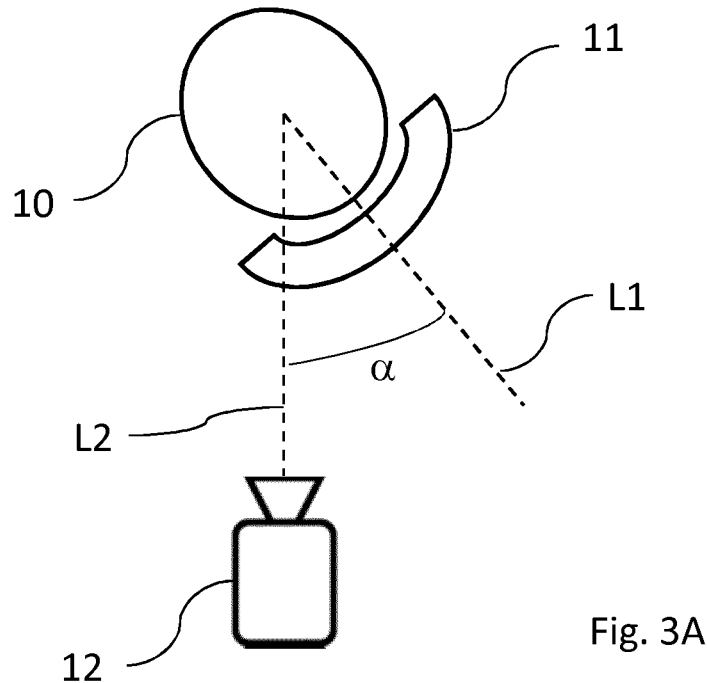
FIG. 3A schematically shows a first example of capturing information at the first location in accordance with the invention.

A user 10 wearing a HMD or similar portable rendering device 11 is shown in top view in FIG. 3A. In the arrangement of FIG. 3A, the camera or capturing device 12 faces the (first) user 10, but the user 10 is not facing the camera. The line-of-sight L2 of the camera 12 and the line-of-sight L1 of the user 10 and HMD 11 enclose an angle α, as shown. Ideally, this angle α should be small, for example approximately zero degrees. However, in the example shown, the angle α is substantially larger than zero.

The angle α represents the orientation of the capturing device 12 relative to the virtual reality device 11. In accordance with the invention, this angle α may be determined and may then be used to provide, in the virtual environment, an indication of the orientation, as will later be explained with reference to FIGS. 4A and 4B. In some embodiments, an indication of the orientation may be provided by rendering a virtual monitor screen in the virtual environment.

It is noted that the angle α is shown as an angle in a (horizontal) plane. However, the angle α may include, in some embodiments, a horizontal component (which may be referred to as α') and a vertical component (which may be referred to as α").

The angle α representing the relative orientation of the capturing device 12 may be determined using images captured by the capturing device 12 and suitable image processing techniques, which may be known per se. Additionally, or alternatively, the angle α may be determined by suitable sensors, such as optical sensors and/or radar sensors, which may be stationary or may be mounted on the portable rendering device 11.

Figure 3B:
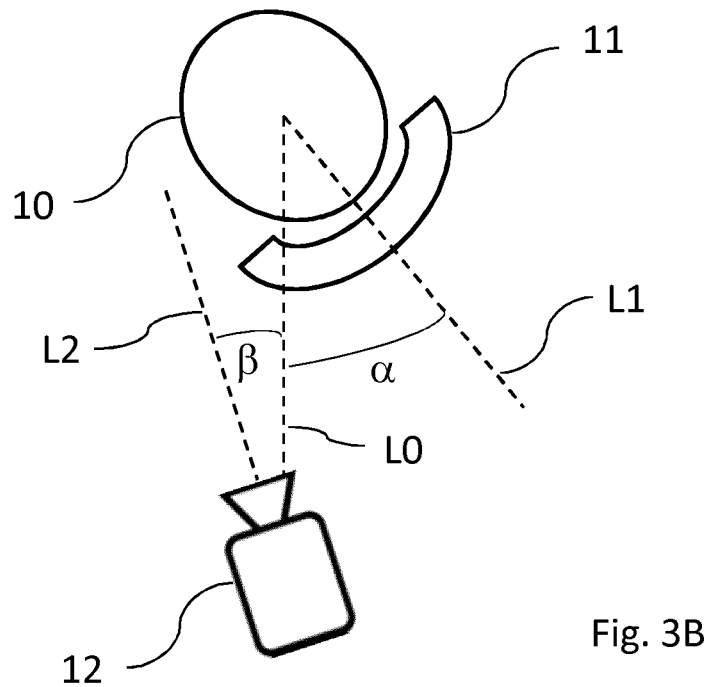
FIG. 3B schematically shows a second example of capturing information at the first location in accordance with the invention.

In the arrangement of FIG. 3A, the capturing device 12 is facing the user 10, even though the user 10 is not facing the capturing device 12. In the arrangement of FIG. 3B, the capturing device (or camera) 12 is not facing the user 10, and a non-zero angle β is enclosed by the line-of-sight L2 of the camera 12 and the line L0 connecting the camera 12 and the user 10 (as well as the HMD 11). It will be understood that ideally, the line-of-sight L2 and the connecting line L0 coincide, as in FIG. 3B. The additional angle β may, in accordance with the invention, also be detected and may be used to provide indications to the user 10, for example, but not exclusively, visual indications in the virtual environment.

More in particular, in an embodiment the method according to the invention may further include determining an orientation β of the virtual reality device 11 relative to the at least one capturing device 12. Additionally, the method may include adjusting the rendering of the virtual monitor in the virtual environment in dependence of said orientation β. The method may therefore include taking both angles α and β into account.

Figure 4A:
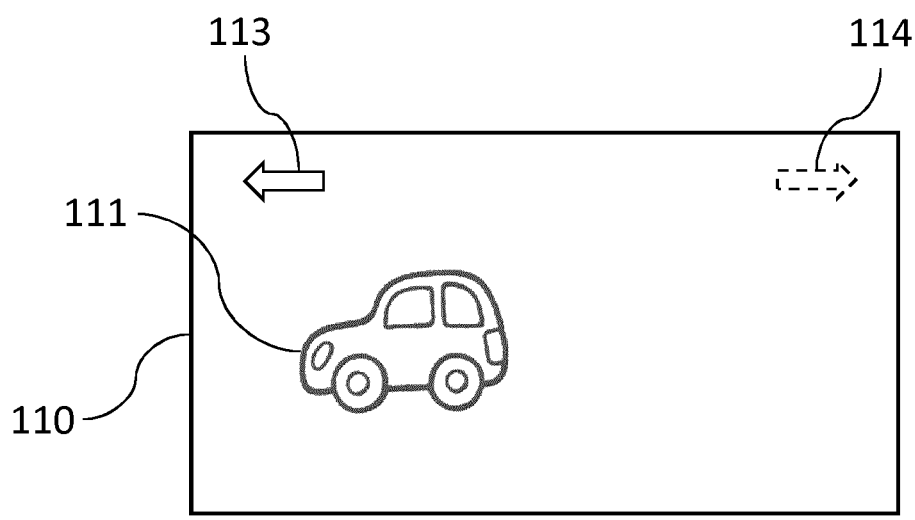
FIG. 4A schematically shows a first example of a virtual environment according to the present invention.

FIG. 4A shows an exemplary image (that is, visual information) rendered by a virtual reality device or augmented reality device, such as the device 11 in FIGS. 1, 3A and 3B. The image 110 contains an object 111 which is part of the rendered virtual (or augmented) reality. According to the invention, the image 110 may also contain a visual indication 113 (or 114, only one of which may be present at a time). Such a visual indication may be presented to a user to indicate the direction in which to turn her head so as to decrease the angle α (see FIGS. 3A and 3B). In the embodiment shown, the visual indications 113 and 114 are shown as arrows, but other suitable shapes (triangles, circles, etc.) may be chosen. In addition to or instead of a visual indication 113 or 114, an aural indication may be provided, such as a suitable sound near the corresponding ear of the user (closer to the left ear when the indication represents "left", etc.), or a spoken indication (such a "left" or "right").

Figure 4B:
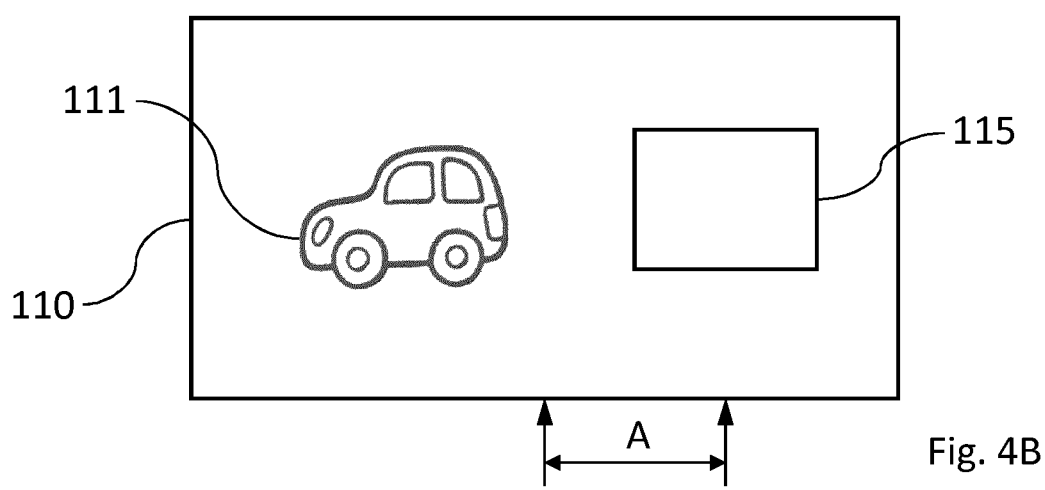
FIG. 4B schematically shows a second example of a virtual environment according to the present invention.

In the embodiment of FIG. 4B, the visual indications 113 and 114 are replaced by a virtual monitor 115. As can be seen in FIG. 4B, the centre of the virtual monitor 115 is displaced over a distance A relative to the centre of the image 110. This distance A may be used as a visual indication which may be presented to a user to indicate the direction in which to turn her head so as to decrease the angle α (see FIGS. 3A and 3B). The virtual monitor 115 may render any suitable image, such as the face of another user involved in a video conference.

Figure 5:
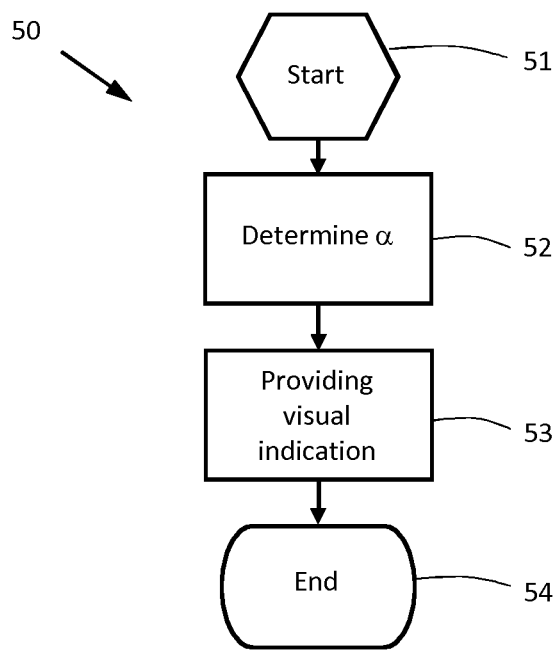
FIG. 5 schematically shows an exemplary embodiment of a method in accordance with the invention.

An embodiment of a method according to the invention is schematically presented in FIG. 5. The method 50 of FIG. 5 starts at 51. At action 52, the angle α is determined. At 53, a visual indication is provided to the user of the virtual reality (or augmented reality) device, which visual indication is dependent on the determined angle α, which is representative of the orientation of the virtual reality device relative to the capturing device. It is noted that if the angle α is small (for example smaller than ±5 degrees, or ±10 degrees), no visual (or aural) indication may be rendered. The method ends at 54.

Figure 6A:
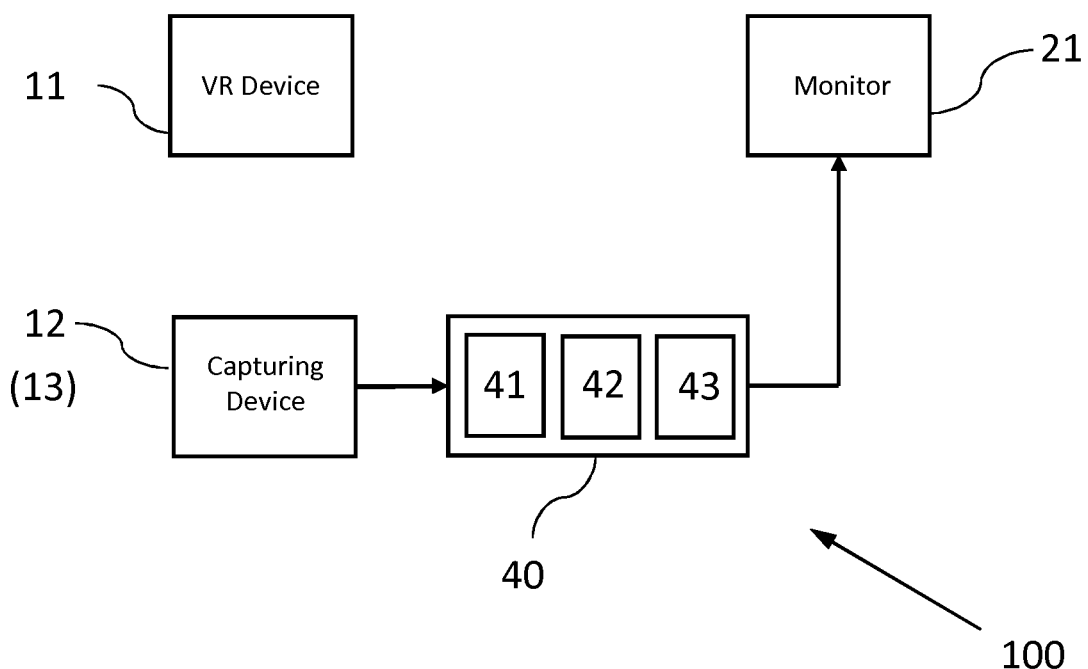
FIG. 6A schematically shows a first embodiment of a system for rendering information in accordance with the invention.
Figure 6B:
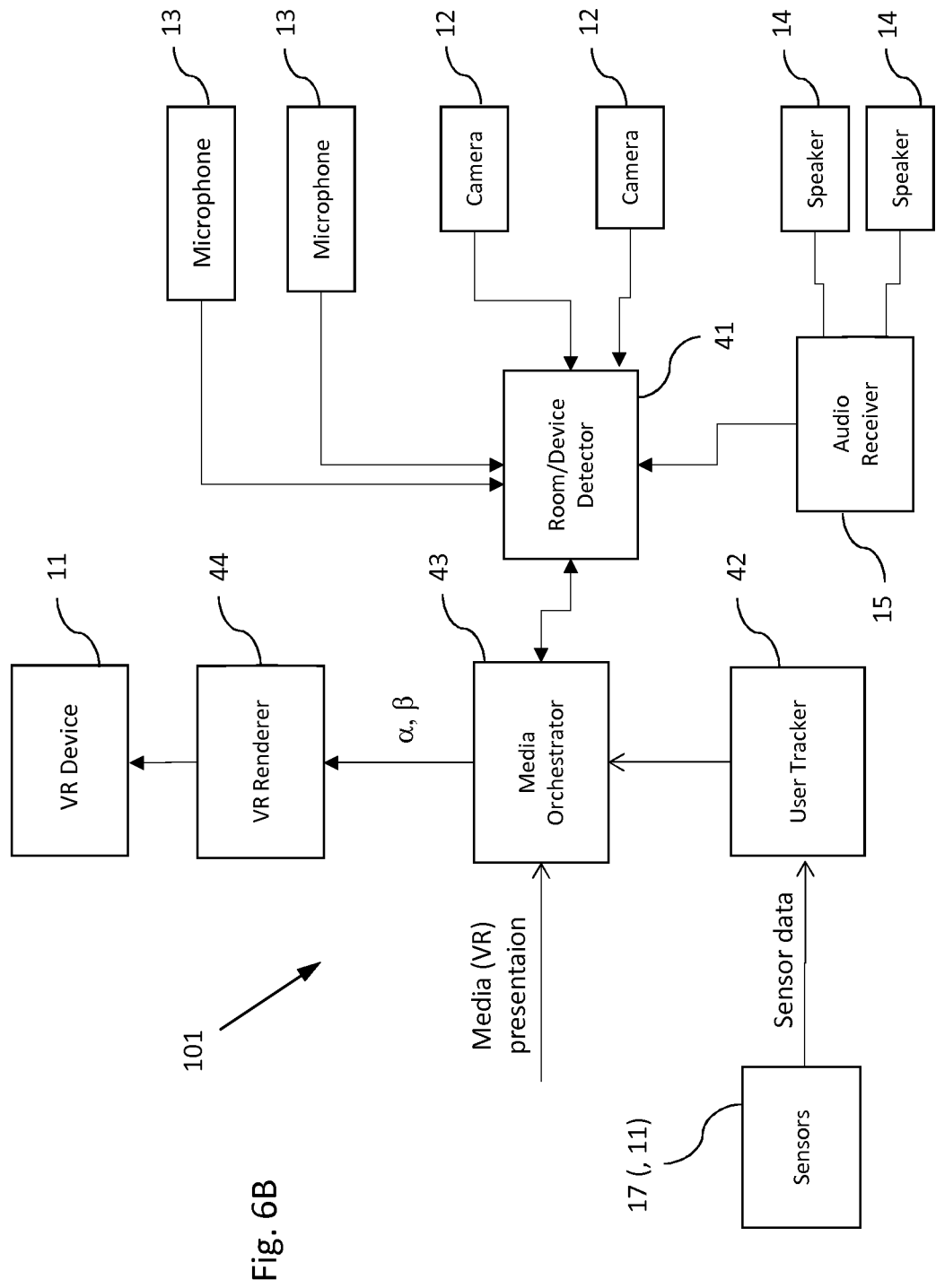
FIG. 6B schematically shows a second embodiment of a system for rendering information in accordance with the invention.

Exemplary embodiments of a system for facilitating capturing visual information are schematically illustrated in FIGS. 6A and 6B. The system 100 of FIG. 6A includes a virtual reality (VR) device 11 configured to render visual information representing a virtual environment, at least one capturing device 12 configured to capture information representing a real environment comprising the virtual reality device 11, and at least one monitor 21 configured to render the information captured by the at least one capturing device 12. The VR device 11, the capturing device 12 (and optionally 13) and the monitor 21 may correspond to their counterparts in FIGS. 1, 2A and 2B.

The system 100 of FIG. 6A may further comprise a control subsystem 40 which may be configured to determine an orientation (α and/or β) of the at least one capturing device 12 relative to the virtual reality device 11, and to cause the virtual reality device 11 to provide in the virtual environment a visual indication of the orientation (α and/or β).

Determining the orientation α (see FIG. 3A) and the orientation β (see FIG. 3B) may be achieved in various ways. One option is to determine the absolute position and direction of both the capturing device 12 and the VR device 11. These positions may for example be determined using a coordinate system for the first location and the directions may be indicated using an angle with respect to a determined/agreed upon zero angle, or as a vector in the coordinate system. When both positions and directions are known, the media orchestrator 43 may determine the orientation α and orientation ß.

Alternatively, the orientations α and ß may be determined only in a relative manner, if either the capturing device 12 captures and detects the VR device 11, or if a sensor attached to the VR device 11 (e.g. a camera or other sensor) detects the capturing device 12. In this case, the absolute position and direction may not be needed to determine the orientations α and ß. If the capturing device 12 can detect the presence of the VR device 11 in its view, it can determine the orientation R. Also, e.g. based on known characteristics of the VR device 11 such as detectable physical points or infrared lighting (as known in the art), the capturing device may also determine the direction the VR device is facing relative to the capturing device itself, i.e. orientation α.

In the exemplary embodiment shown, the control subsystem 40 comprises a device detector unit 41 configured for detecting the available sensors and actuators and their capabilities/characteristics, such as the capturing device 12 and the VR device 11 and optionally other available sensors and actuators and their capabilities and characteristics. For the capturing device 12 and for other sensors, the device detector unit 41 may determine their position and which direction they are facing (in case the orientations α and ß are determined based on these (absolute) positions and directions, as explained above). The device tracker unit 42 uses available sensors, such as those included in the VR device 11 (e.g. a gyroscope) or external sensors (e.g. a camera, a radar sensor or the capturing device 12), to track the position and direction of the VR device 11 or possibly tracking the position and direction of the user wearing the VR device 11. The output of both the device detector unit 41 and device tracker unit 42 may then be used by the media orchestrator 43 to determine the orientation α and/or the orientation ß.

Alternatively, as explained above, the capturing device 12 may be able to capture and detect the VR device 11. In such a case, the device detector unit 41 may determine this and indicate this to the media orchestrator 43. The capturing device 12 then functions as a device tracker unit 42, and can determine orientations α and ß directly and supply these to the media orchestrator 43. Similarly, the VR device 11 may be able to detect the capturing device 12, and thus supply both orientations α and ß to the media orchestrator 43. Alternatively, combinations of the above may be applicable, e.g. the positions of the VR device 11 and capturing device 12 may be determined in an absolute manner while the directions they are facing are determined in a relative manner. The device tracker unit 42 may thus be distributed over different devices such as the VR device 11 and capturing device 12.

The exemplary system 101 illustrated in FIG. 6B may include a virtual reality device 11 (which may correspond to the virtual reality device 11 illustrated in the previous figures), capturing devices (cameras) 12, further capturing devices (microphones) 13, audio rendering devices (loudspeakers) 14, an audio receiver 15, (optional) sensors 17, a room/device detector 41, a device tracker or user tracker 42, a media orchestrator 43 and a VR renderer 44.

The sensors 17 may be part of the VR device 11, but some embodiments may include sensors 17 which are distinct from the VR device 11. In other embodiments, the sensors 17 may be constituted by the VR device 11, for example if the sensor data produced by the sensors 17 include only image information from which one or more orientations are derived. If separate sensors 17 are provided, they may include cameras, stereoscopic cameras, gyroscopes, radar sensors, infrared sensors, sound sensors, and/or other sensors. Sensors external to the VR device 11 may be useful to determine an orientation (optionally including a position and/or distance) of the VR device 11. External sensors 17 may be stationary (mounted on walls, for example) or movable/portable. Some sensors 17 may be mounted on the VR device 11 or on a capturing device (in the present example: camera) 12 or may be integrated therein. The sensors 17 may serve to track the VR device 11 and/or its user.

The user tracker 42 may determine, using the sensor data produced by the sensors 17, the orientation (which may or may not include the position and/or distance) of the VR device 11. In addition, the user tracker 42 may track this orientation, that is, may dynamically determine the orientation.

In contrast, the room/device detector 41 may statically determine the orientations (which may or may not include the position and/or distance) of the capturing devices 12 and 13 (if present) and of the rendering devices 14 (if present). The orientations which may be determined by the room/device detector 41 may therefore include the orientations of the cameras 12, in the example of FIG. 6B.

Although the room/device detector 41 may be static, in that orientations may be determined only once, or only after a reset of the system, in some embodiments a more dynamic behavior of the room/device detector 41 may be provided, thus repeating the determining of the orientations, for example at regular intervals. In most embodiments, the room/device detector 41 determines which devices (in particular capturing and rendering devices) are present in a room or space, and what their respective orientations are (it is noted that the orientations of some devices may not be determined for reasons of efficiency).

The orientation data determined by the room/device detector 41 and the user tracker 42 may be provided to the media orchestrator 43, which may additionally receive one or more media presentations which are to be rendered by the VR device, and which may contain VR sound data and/or image data. The media orchestrator 43 may be configured to determine orientation data (such as the orientations α and β mentioned before) which may be sent to the VR renderer 44. It is noted that the VR renderer may be configured to produce image data to be displayed by the VR device 11, and that the renderer 44 may not itself display image data. For example, the renderer 44 may be a personal computer that produces the image data and displays this on a connected VR headset. The renderer 44 may also be a computer that produces the image data and sends this as a (video) stream to a separate (mobile) VR headset for displaying there.

The media orchestrator 43 may therefore be configured to instruct the renderer 44 how to render the virtual environment based on, for example:
  the VR device(s) 11 in the room as provided by the room/device detector 41,
  the location and/or orientation of the user/VR device 11 as provided by the user tracker 42, and/or
  one or more media presentations.

As mentioned above, the room/device detector 41 may be configured to detect the physical locations and orientations of actuators and sensors in a room, which may be eligible for usage in an audio-visual communication session, for example. The detection may be achieved by:
  Network based discovery, for example using network protocols such as DLNA, multicast DNS, SAP, to establish availability of devices. Some devices may be configured to report their position.
  Scanning of the environment, for example use of one or more cameras to detect devices using content analysis algorithms. The cameras may be fixed, for example be part of a laptop or TV, or may be portable, for example a camera on a smartphone or a VR headset.
  A combination of network based discovery, e.g. using sensory input from a discovered device (camera/microphone) to analyse its location and orientation in the physical location, for instance using pose estimation.
  Manual configuration, by the user.
  A combination of the above.

In addition to establishing their position and/or orientation, the Room/Device detector 41 may be configured to determine the device capabilities (e.g. support media features) and their settings (device currently in use). The detector can establish these features directly or via an intermediate device, such as an audio receiver 15, which is connected to one or more loudspeaker devices 14.

The user tracker 42 may be configured to determine and track the position of the virtual reality device (and/or of the user), and also to track the direction of view in the physical room and virtual room. Tracking can be done by means of an external device (for example a webcam) or can be part of a user device attached to or carried by the user (such as a smartphone, VR headset), or a combination thereof.

The media orchestrator 43 may be configured to dynamically determine the assignment of one or more virtual objects to one or more physical objects in the room, such that the physical objects are aligned with the virtual object, based on one or more of the following criteria:
  the media presentation to be rendered in the virtual room.
  the location and orientation of the sensors and actuators.
The output may be a configuration file (or stream) which may comprise object entries with the following configuration options:
  the position- and orientation-coordinates of the object in a 3D plane. Coordinates can be absolute, or relative with respect to a fixed origin in the 3D space;
  the size of the virtual object. Size can be absolute or relative to the size of the virtual 3D space;
  the role(s) of the object (unidirectional, directional, interactive, audio, video); and
  URI to content to be rendered at the position of the virtual objects. Examples could be:
    Link to a media file (see, for example, http://server/video.mp4),
    Link to an interactive session (webrtc://linktosession-description),
    Link to a Media Presentation Description manifest: (http://server/dash.mpd).

The renderer 44 may render and/or populate the virtual environments with virtual objects, taking into account the configuration options provided by the media orchestrator 43, such that the real world sensors and actuators are aligned with virtual representations of users or their proxies in the virtual room.

As mentioned above, the virtual reality device 11 and the at least one capturing device 12 may be used at a first location, which may be distinct from a second location where the information captured at the first location 1 is rendered. Accordingly, an embodiment of the method of facilitating involves capturing (visual and/or aural) information at a first location for rendering at a second location, wherein at the first location:
  visual and/or aural information representing a virtual environment is rendered using a virtual reality device 11, and
  visual and/or aural information representing a real environment comprising the virtual reality device 11 is captured using at least one capturing device 12; and
wherein at the second location:
  the information captured at the first location 1 is rendered;
the method comprising:
  determining at the first location an orientation α of at least one capturing device 12 relative to the virtual reality device 11, and
  providing in the virtual environment a visual indication of said orientation α.

The information captured at the first location 1 using at least one capturing device 12 may comprise visual information only, aural information only, but preferably comprises both visual and aural information. Similarly, the information representing the virtual environment may comprise visual information only, aural information only, but preferably comprises both visual and aural information.

As will be appreciated by one skilled in the art, aspects of the present invention may be embodied as a system, method or computer program product. Accordingly, aspects of the present invention may take the form of an entirely hardware embodiment, a software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, for example, stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid-state drive, a random access memory (RAM), a non-volatile memory device, a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless (using electromagnetic and/or optical radiation), wired, optical fibre, cable, etc., or any suitable combination of the foregoing. Computer program code for carrying out operations for aspects of the present invention may be written in any combination of one or more programming languages, including an object oriented programming language such as Java(TM), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 8:
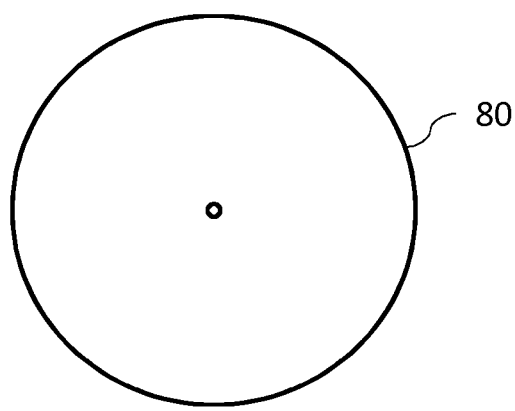
FIG. 8 schematically shows a software program product including processor instructions for carrying out the method.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. FIG. 8 schematically shows an example of a software program product including processor instructions for causing a processor to carry out the method.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the functions noted in the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the invention relates to all possible combinations of features recited in the claims.

Figure 7:
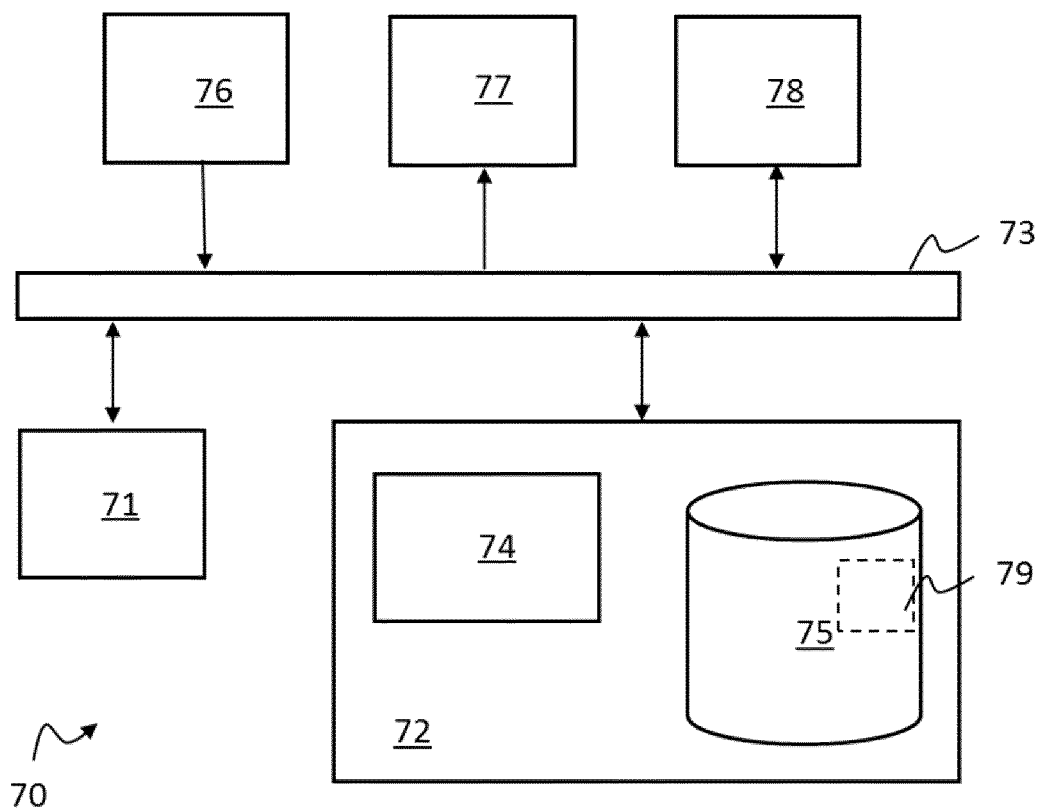
FIG. 7 shows a schematic block diagram of a general system to be employed in the disclosed method.

FIG. 7 is a block diagram illustrating an exemplary data processing system that may be used as a part of a user equipment or as a network node, such as base station.

Data processing system 70 may include at least one processor 71 coupled to memory elements 72 through a system bus 73. As such, the data processing system 70 may store program code within memory elements 72. Further, processor 71 may execute the program code accessed from memory elements 72 via system bus 73. In one aspect, data processing system 70 may be implemented as a computer that is suitable for storing and/or executing program code. It should be appreciated, however, that data processing system 70 may be implemented in the form of any system including a processor and memory that is capable of performing the functions described within this specification.

Memory elements 72 may include one or more physical memory devices such as, for example, local memory 74 and one or more bulk storage devices 75. Local memory may refer to random access memory or other non-persistent memory device(s) generally used during actual execution of the program code. A bulk storage device 75 may be implemented as a hard drive or other persistent data storage device. The data processing system 70 may also include one or more cache memories (not shown) that provide temporary storage of at least some program code in order to reduce the number of times program code must be retrieved from bulk storage device 75 during execution.

Input/output (I/O) devices depicted as input device 76 and output device 77 optionally can be coupled to the data processing system 70. Examples of input devices may include, but are not limited to, for example, a keyboard, a pointing device such as a mouse, a touchscreen, or the like. Examples of output device may include, but are not limited to, for example, a monitor or display, speakers, or the like. Input device 76 and/or output device 77 may be coupled to data processing system 70 either directly or through intervening I/O controllers. A network adapter 78 may also be coupled to data processing system 70 to enable it to become coupled to other systems, computer systems, remote network devices, and/or remote storage devices through intervening private or public networks. The network adapter 78 may comprise a data receiver for receiving data that is transmitted by said systems, devices and/or networks to said data processing system 70 and a data transmitter for transmitting data to said systems, devices and/or networks. Modems, cable modems, and Ethernet cards are examples of different types of network adapters that may be used with data processing system 70.

As pictured in FIG. 7, memory elements 72 may store an application 79. It should be appreciated that data processing system 70 may further execute an operating system (not shown) that can facilitate execution of the application. Applications implemented in the form of executable program code can be executed by data processing system 70, for example, by processor 71. Responsive to executing the application 79, the data processing system 70 may be configured to perform one or more operation as disclosed in the present application in further detail.

In one aspect, for example, data processing system 70 may represent a multipoint transmission control system MTC or a user device UE. In that case, application 29 may represent a client application that, when executed, configures data processing system 70 to perform the various functions described herein with reference to an MTC or a user equipment. Examples of an MTC include a base station of a telecommunications network 1 providing cellular wireless access, for example a NodeB or an eNB. The user equipment can include, but is not limited to, a personal computer, a portable computer, a mobile phone, or the like.

In another aspect, data processing system 70 may represent a transmission node TN as described herein, in which case application 79, when executed, may configure data processing system 70 to perform operations as described in the present disclosure.

It is noted that the method has been described in terms of steps to be performed, but it is not to be construed that the steps described must be performed in the exact order described and/or one after another. One skilled in the art may envision to change the order of the steps and/or to perform steps in parallel to achieve equivalent technical results.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The abstract should not be used to limit the scope of the claims, and neither should reference numbers in the claims.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (for example, read-only memory devices within a computer such as CD-ROM disks readable by a CD-ROM drive, ROM chips or any type of solid-state non-volatile semiconductor memory) on which information is permanently stored; and (ii) writable storage media (for example, flash memory, floppy disks within a diskette drive or hard-disk drive or any type of solid-state random-access semiconductor memory) on which alterable information is stored.

It will therefore be understood by those skilled in the art that the present invention is not limited to the embodiments

The invention claimed is:

1. A method of facilitating capturing visual information, wherein:
    visual information representing a virtual environment is rendered using a virtual reality device,
    information representing a real environment comprising the virtual reality device is captured using at least one capturing device, and
    the captured information is rendered,
    the method comprising:
    determining an orientation of the at least one capturing device relative to the virtual reality device, the orientation of the at least one capturing device being represented by the angle between i) the line-of-sight axis of the virtual reality device, and ii) the line between the virtual reality device and the at least one capturing device, and
    providing to a user of the virtual reality device in the virtual environment a visual indication of said orientation to bring to the user's attention in the virtual environment a misalignment between the orientation of the capturing device relative to the virtual reality device.

2. The method according to claim 1, wherein the information captured using the at least one capturing device comprises visual information.

3. The method according to claim 1, wherein providing an indication of the relative orientation of the at least one capturing device in the virtual environment comprises:
    rendering in the virtual environment a virtual monitor at a relative orientation corresponding with the relative orientation of the at least one capturing device in the real environment, which virtual monitor renders visual information captured by at least one further capturing device.

4. The method according to claim 3, further comprising:
    using at least two capturing devices,
    determining a respective orientation of the at least two capturing devices relative to the virtual reality device,
    determining a respective distance of the at least two capturing devices relative to the virtual reality device, and
    rendering in the virtual environment at least two virtual monitors at respective relative orientations and respective relative distances corresponding with the relative orientations and the respective distances of the at least two capturing devices in the real environment.

5. The method according to claim 1, further comprising:
    determining an orientation of the virtual reality device relative to the at least one capturing device, the orientation of the virtual reality device being represented by the angle between i) the line-of-sight axis of the at least one capturing device and ii) the line between the at least one capturing device and the virtual reality device, and
    adjusting the rendering of a virtual monitor in the virtual environment in dependence of said orientation.

6. The method according to claim 1, wherein determining the relative orientation of the at least one capturing device in relation to the virtual reality device comprises using the at least one capturing device.

7. The method according to claim 1, wherein the virtual reality device is provided with at least one additional capturing device for determining the relative orientation of the virtual reality device.

8. The method according to claim 1, wherein the at least one capturing device comprises a microphone and wherein at least one monitor comprises a loudspeaker.

9. The method according to claim 1, wherein the at least one capturing device comprises a camera and wherein at least one monitor comprises a visual monitor.

10. The method according to claim 1, wherein the method is performed at a first location and the captured information is rendered at a second location.

11. A software program product comprising instructions for causing a processor to carry out the method according to claim 1.

12. A system for facilitating capturing visual information, wherein the system comprises:
    a virtual reality device configured to render visual information representing a virtual environment,
    at least one capturing device configured to capture information representing a real environment comprising the virtual reality device, and
    at least one monitor configured to render the information captured by the at least one capturing device,
    the system further comprising a control subsystem configured for:
    using the at least one capturing device, determining an orientation of the at least one capturing device relative to the virtual reality device, the orientation being represented by the angle between i) the line-of-sight axis of the virtual reality device, and ii) the line between the virtual reality device and the at least one capturing device, and for
    causing the virtual reality device to provide to a user of the virtual reality device in the virtual environment a visual indication of said orientation to bring to the user's attention in the virtual environment a misalignment between the orientation of the capturing device relative to the virtual reality device.

13. The system according to claim 12, wherein the control subsystem comprises:
    a device detector unit configured for detecting an orientation of the at least one capturing device and for producing first orientation data,
    a device tracker unit configured for tracking an orientation of a virtual reality device and for producing second orientation data, the second orientation data being represented by the angle between i) the line-of-sight axis of the at least one capturing device, and ii) the line between the at least one capturing device and the virtual reality device, and
    a media orchestrator configured for combining the first orientation data, the second orientation data and media data to produce an orientation-dependent media stream.

14. The system according to claim 12, wherein the at least one capturing device comprises a camera and wherein the at least one monitor comprises a virtual monitor.

15. The system according to claim 12, wherein the virtual reality device is a portable device.

16. A control subsystem configured for use in the system according to claim 12.

17. The system according to claim 14, wherein the at least one capturing device comprises a microphone and wherein the at least one monitor comprises a loudspeaker.

18. The system according to claim 15, wherein the virtual reality device is a head mounted display.

* * * * *